United States Patent
Kuriyama

(10) Patent No.: US 7,091,144 B2
(45) Date of Patent: Aug. 15, 2006

(54) GLASS FOR WAVELENGTH DIVISION MULTIPLEXING OPTICAL FILTER

(75) Inventor: Nobuya Kuriyama, Mie (JP)

(73) Assignee: Central Glass Co., Ltd., Ube (JP)

( * ) Notice: Subject to any disclaimer, the term of this patent is extended or adjusted under 35 U.S.C. 154(b) by 19 days.

(21) Appl. No.: 10/445,058

(22) Filed: May 27, 2003

(65) Prior Publication Data

US 2003/0224180 A1 Dec. 4, 2003

(30) Foreign Application Priority Data

| May 27, 2002 | (JP) | ............................. 2002-151695 |
| May 27, 2002 | (JP) | ............................. 2002-151696 |
| Jun. 26, 2002 | (JP) | ............................. 2002-186216 |

(51) Int. Cl.
*B32B 17/06* (2006.01)
*C03C 3/078* (2006.01)

(52) U.S. Cl. .................. 501/72; 501/70; 428/426; 428/428; 428/432; 428/446

(58) Field of Classification Search ................ 501/72, 501/68–70; 428/446, 426, 428, 432
See application file for complete search history.

(56) References Cited

U.S. PATENT DOCUMENTS

| 4,386,162 | A | * | 5/1983 | Beall ............................. 501/3 |
| 5,070,044 | A | * | 12/1991 | Pinckney ........................ 501/3 |
| 5,273,834 | A | * | 12/1993 | Hoover et al. ......... 428/694 ST |
| 5,350,716 | A | * | 9/1994 | Beall et al. ...................... 501/5 |
| 5,719,989 | A | | 2/1998 | Cushing |
| 5,859,717 | A | | 1/1999 | Scobey et al. |
| 6,332,338 | B1 | | 12/2001 | Hashimoto et al. |
| 6,410,466 | B1 | | 6/2002 | Goto et al. |
| 6,461,733 | B1 | | 10/2002 | Goto |
| 6,465,105 | B1 | | 10/2002 | Johnson et al. |
| 6,818,576 | B1 | * | 11/2004 | Ikenishi et al. ................ 501/65 |
| 6,825,142 | B1 | * | 11/2004 | Pucilowski et al. ........... 501/64 |
| 2003/0050173 | A1 | | 3/2003 | Lin ............................. 501/70 |
| 2004/0012871 | A1 | * | 1/2004 | Yoshihara et al. .......... 359/885 |

FOREIGN PATENT DOCUMENTS

| CN | 1241169 | 1/2000 |
| CN | 1285667 | 2/2001 |
| EP | 0127821 | 12/1984 |
| EP | 1074519 A2 | 2/2001 |
| EP | 1081512 A1 | 3/2001 |
| GB | 804451 | 11/1958 |
| JP | 6-94378 | 11/1994 |
| JP | 10-339825 | 12/1998 |
| JP | 10-512975 | 12/1998 |
| JP | 2001-48584 | 2/2000 |
| JP | 2001-66425 | 3/2001 |
| JP | 2001-89184 | 4/2001 |
| JP | 2001-180967 | 7/2001 |

OTHER PUBLICATIONS

European Search Report dated Sep. 23, 2003.
Japanese Industrial Standard (JIS) R 3502.

* cited by examiner

*Primary Examiner*—David Sample
(74) *Attorney, Agent, or Firm*—Crowell & Moring LLP

(57) ABSTRACT

The invention relates to first, second and third glasses for wavelength division multiplexing optical filters. The first glass contains 50–65 wt % of $SiO_2$, 5–25 wt % of $Na_2O$, 4–20 wt % of $K_2O$, 0–20 wt % of CaO, 0–10 wt % of MgO, 0–10 wt % of BaO, 0–10 wt % of $Al_2O_3$, and 0–10 wt % of $TiO_2$. The second glass contains 35–55 wt % of $SiO_2$, 10–30 wt % of $TiO_2$, 4–20 wt % of $ZrO_2$, 5–25 wt % of $Na_2O$, 0–10 wt % of $Al_2O_3$, 0–20 wt % of $CeO_2$, 0–5 wt % of $Li_2O$, 0–20 wt % of $K_2O$, and 0–3 wt % of at least one metal oxide selected from MgO, CaO, SrO, BaO, and ZnO. The third glass contains 35–55 wt % of $SiO_2$, 0–20 wt % of $Al_2O_3$, 0–10 wt % of $B_2O_3$, 1–35 wt % of $TiO_2$, 1–15 wt % of $CeO_2$, 0–10 wt % of $Li_2O$, 5–25 wt % of $Na_2O$, and 0–20 wt % of $K_2O$.

8 Claims, 1 Drawing Sheet

FIGURE
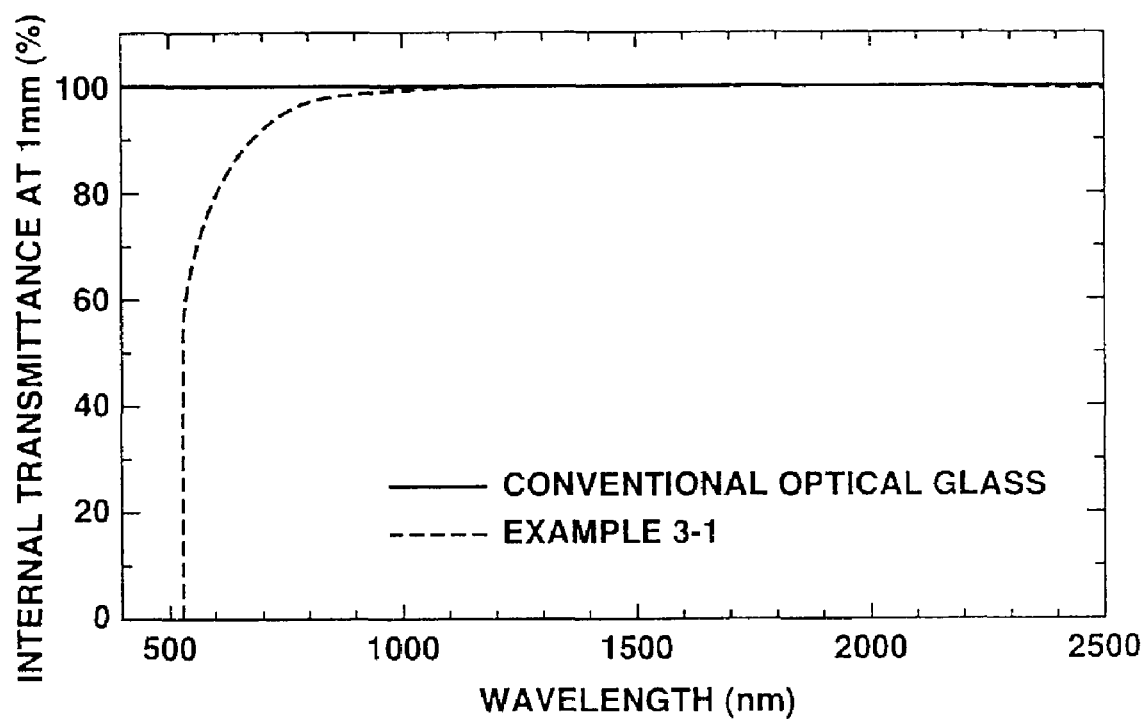

GLASS FOR WAVELENGTH DIVISION MULTIPLEXING OPTICAL FILTER

BACKGROUND OF THE INVENTION

The present invention relates to a glass that is required to have a high thermal expansion coefficient as a material of optical filers used for wavelength division multiplexing (WDM) in optical communication to allow the passage of only a certain predetermined wavelength region.

In general, optical filters can be classified into those for cutting and transmitting certain predetermined wavelengths and those for lowering light transmittance. Examples of the former filters are (a) bandpass filter for transmitting only certain predetermined wavelengths, (b) notch-pass filter for cutting only certain predetermined wavelengths, (c) low-pass filter for transmitting only wavelengths shorter than a particular wavelength, and (d) high-pass filter for transmitting only wavelengths longer than a particular wavelength. A typical example of the latter filters is ND filter.

In wavelength multiplexing optical communication, bandpass filter is used for combining lights having slightly different wavelengths or for selectively taking a particular wavelength light out of a light containing a plurality of wavelength components.

Narrow bandpass filter has been proposed along the development of WDM system and is referred to as "WDM optical filter".

Japanese Patent Unexamined (Kokai) Publication 10-339825, corresponding to U.S. Pat. No. 5,859,717, discloses a multiplexing device having a multilayer film formed on a substrate.

Japanese Patent Unexamined (Kohyo) Publication 10-512975, corresponding to U.S. Pat. No. 5,719,989, also discloses a dielectric multilayer film bandpass filter.

In course of the development of high-precision WDM systems, it is required to narrow the transmission wavelength bandwidth of a WDM optical filter in order to conduct a high-density wavelength multiplexing optical communication. Narrowing the transmission wavelength bandwidth leads to a narrowed band center wavelength. Therefore, even the wavelength center deviation caused by a slight temperature fluctuation may interfere with the bandpass filter performance. Thus, it is required to prevent a WDM optical filter from having a refractive index fluctuation caused by the temperature fluctuation upon its use. In other words, it is required to make the wavelength temperature shift close to zero.

It is known that the temperature shift depends on thermal expansion coefficient of the glass and that of the dielectric multilayer film of a WDM optical filter.

Japanese Patent Unexamined (Kokai) Publication 2001-89184, corresponding to U.S. Pat. No. 6,465,105, discloses a glass substrate for use in WDM optical filter. Japanese Patent Unexamined (Kokai) Publication 2001-66425, corresponding to U.S. Pat. No. 6,461,733, discloses a glass for a light filter. The glasses of these publications may be brittle due to their glass compositions. Thus, it may be possible that the glass substrate having such composition is broken at its corner portion when the glass substrate is cut by a diamond cutter into a chip, thereby lowering its yield.

Japanese Patent Unexamined (Kokai) Publication 2001-48584, corresponding to U.S. Pat. No. 6,410,466, discloses glass ceramics (crystallized glasses) for a light filter. It is naturally necessary to provide a crystallization step by conducting a long-time heating treatment in the production of glass ceramics. Such step may increase the production cost. Furthermore, it may be difficult to spot or notice the final product (filter chip) due to its small size (e.g., 1 mm square) and its colorlessness and transparency.

SUMMARY OF THE INVENTION

It is an object of the present invention to provide a glass for a wavelength division multiplexing optical filter, which has a suitable thermal expansion coefficient to lower the temperature dependency of filter characteristics.

It is another object of the present invention to provide a glass for a wavelength division multiplexing optical filter, which is superior in workability to produce a small-size chip of the glass.

According to a first aspect of the present invention, there is provided a first glass for a wavelength division multiplexing optical filter. The first glass comprises 50–65 wt % of $SiO_2$, 5–25 wt % of $Na_2O$, 4–20 wt % of $K_2O$, 0–20 wt % of CaO, 0–10 wt % of MgO, 0–10 wt % of BaO, 0–10 wt % of $Al_2O_3$, and 0–10 wt % of $TiO_2$. The first glass has (a) an average thermal expansion coefficient of from $110\times10^{-7}/°$ C. to $130\times10^{-7}/°$ C. within a range of 50–150° C.; (b) a Young's modulus of 80 GPa or lower; and (c) a density of 2.8 g/cm$^3$ or lower.

According to a second aspect of the present invention, there is provided a second glass for a wavelength division multiplexing optical filter. The second glass comprises 35–55 wt % of $SiO_2$, 10–30 wt % of $TiO_2$, 4–20 wt % of $ZrO_2$, 5–25 wt % of $Na_2O$, 0–10 wt % of $Al_2O_3$, 0–20 wt % of $CeO_2$, 0–5 wt % of $Li_2O$, 0–20 wt % of $K_2O$, and 0–3 wt % of at least one metal oxide selected from the group consisting of MgO, CaO, SrO, BaO, and ZnO. The second glass has (a) an average thermal expansion coefficient of from $100\times10^{-7}/°$ C. to $130\times10^{-7}/°$ C. within a range of 50–150° C.; (b) a Young's modulus of 75 to 85 GPa; (c) a glass transition point of 500° C. or higher; and (d) a Vickers hardness of 550 or greater.

According to a third aspect of the present invention, there is provided a third glass for a wavelength division multiplexing optical filter. The third glass comprises 35–55 wt % of $SiO_2$, 0–20 wt % of $Al_2O_3$, 0–10 wt % of $B_2O_3$, 1–35 wt % of $TiO_2$, 1–15 wt % of $CeO_2$, 0–10 wt % of $Li_2O$, 5–25 wt % of $Na_2O$, and 0–20 wt % of $K_2O$. The third glass has (a) an average thermal expansion coefficient of from $100\times10^{-7}/°$ C. to $130\times10^{-7}/°$ C. within a range of 50–150° C.; and (b) a Young's modulus of 75 GPa or greater.

BRIEF DESCRIPTION OF THE DRAWINGS

FIGURE is a graph showing internal transmittance (at 1 mm thickness) of the glass according to Example 3–1 and that of a conventional, colorless, transparent glass.

DESCRIPTION OF THE PREFERRED EMBODIMENTS

The above-mentioned first, second and third glasses for a wavelength division multiplexing (WDM) optical filter have the following advantages. Firstly, they are not glass ceramics (crystallized glasses). Therefore, it is not necessary to provide a long-time heating treatment for producing glass ceramics, and thereby it is possible to lower the production cost. Secondly, they have suitable thermal expansion coefficients such that it is possible to put a suitable compressive stress to a multilayer film formed on the glass substrate, that the temperature dependency of filter characteristics (e.g., center wavelength) can be lowered, and that it is possible to prevent the glass substrate from having warping. Thirdly, they are not brittle due to their respective good Young's moduli. Therefore, they are superior in workability such that it is possible to work them into small-size chips with high yield. In the case of the third glass, it is easily possible to spot or notice the glass substrate as a small-size chip since it has a certain predetermined color.

It is known that there exists an optimum range of thermal expansion coefficient in WDM optical filter. If thermal expansion coefficient is too low, it is not possible to put a sufficient compressive stress to an optical multilayer film of WDM optical filter, and temperature shift of the center wavelength of the filter becomes greater in the positive direction. If thermal expansion coefficient is too high, the above temperature shift becomes greater in the negative direction, and at the same time there arises problems such as exfoliation of the multilayer film.

As stated above, the first glass (soda-lime glass) has an average thermal expansion coefficient of from $110 \times 10^{-7}/°C$ to $130 \times 10^{-7}/°C$ within a range of 50–150° C., and each of the second and third glasses has an average thermal expansion coefficient of from $100 \times 10^{-7}/°C$ to $130 \times 10^{-7}/°C$ within a range of 50–150° C. Each of these ranges of average thermal expansion coefficient was proved to be good by checking the temperature shift of the center wavelength of a three-cavity bandpass filter having $SiO_2/Ta_2O_5$ multilayer film formed on the glass substrate by vapor deposition method. If the average thermal expansion coefficient is in the corresponding range, it is possible to put a suitable compressive stress to the multilayer film. Furthermore, it is possible to substantially lower the temperature dependency of the optical filter characteristics, although it may vary depending on the method for forming the multilayer film on the glass substrate.

In producing a WDM optical filter, each of the first, second, and third glasses is cut into a small-size chip (e.g., 1.5 mm square) using a die or the like. Upon this, these glasses may be broken at their corner portions if they are too brittle. Such break may not occur if they are not too brittle.

It is known in general that materials become brittle with higher Young's modulus. It has recently become clear that even brittle materials (e.g., glass) tend to become brittle with higher Young's modulus. On the other hand, Young's modulus is closely related to strength. Materials become higher in strength with higher Young's modulus.

A plurality of glass substrates (including those of the first, second, and third glasses) having different Young's moduli and multilayer films thereon were cut into small-size chips using a die. Then, the degree of the occurrence of break at their corner portions was evaluated.

With the above evaluation, the first glass with a Young's modulus of 80 GPa or lower was found to have a good workability. Furthermore, it is possible to prevent warping of a glass substrate of the first glass upon the formation of a multilayer film thereon, if it has a Young's modulus of 80 GPa or lower, preferably 75 GPa or lower. Thus, Young's modulus of the first glass is 80 GPa or lower at a working temperature upon cutting into a small-size chip.

With the above evaluation, the second glass with a Young's modulus of 85 GPa or lower was found to have a good workability. Furthermore, the second glass with a Young's modulus of 75 GPa or higher was found to be capable of limiting warping of a glass substrate upon the formation of a multilayer film thereon to an acceptable range. Thus, Young's modulus of the second glass is from 75 GPa to 85 GPa at a working temperature upon cutting into a small-size chip.

With the above evaluation, the third glass with a Young's modulus of 75 GPa or higher was found to be capable of limiting warping of a glass substrate upon the formation of a multilayer film thereon to an acceptable range. Thus, Young's modulus of the third glass is 75 GPa or higher at a working temperature upon cutting into a small-size chip.

The first glass has a density of 2.8 g/cm$^3$ or lower at a working temperature upon cutting into a small-size chip, since it tends to become brittle with too-high density.

The second glass has a glass transition temperature (Tg) of 500° C. or higher. In producing a WDM optical filter, a small-size chip of the second glass can be subjected to a heating treatment at a suitable temperature that is glass transition temperature or lower in order to correct the bandpass center wavelength of the filter by a certain degree. If the glass transition temperature is too low, it becomes difficult to conduct the heating treatment at a sufficiently high temperature that makes the correction possible. It is needless to say that the first and third glasses also can have a glass transition temperature of 500° C. or higher. Similar to the second glass, a small-size chip of the first or third glass may be subjected to the above heating treatment, too.

The second glass can have a Vickers hardness of 550 or greater at a working temperature upon cutting into a small-size chip. In case that a multilayer film has exfoliated from a glass substrate of the second glass, it is possible to prevent the second glass from adhering to the exfoliated multilayer film due to such Vickers hardness.

The second glass contains an alkali component(s) (e.g., $Na_2O$) that is extractable by boiling water in an alkali component extraction (elution) test according to Japanese Industrial Standard (JIS) R 3502 (published by Incorporation Foundation "Nihon Kikaku Kyokai") and that is in an amount of 0.7 mg or less per an amount of the second glass expressed in gram. This amount has an absolute number that is identical with specific gravity of the second glass. In other words, if specific gravity of the second glass is, for example, 2.6, the amount of the second glass used in the alkali component extraction test will be 2.6 g. Details of this test are written in JIS R 3502, which is incorporated herein by reference, and can be summarized as follows. At first, 40 ml of distilled water are added to a round-bottom flask, and then the flask is maintained in boiling-water bath for at least 10 min. After that, the above-mentioned amount of the second glass is added in the form of powder to the flask. Furthermore, 10 ml of distilled water are added in a manner to wash the second glass away from the inside wall of the flask. Then, the flask is heated for 60 min in boiling-water bath. The resulting liquid is cooled down and is subjected to a titration using three drops of methyl red (acid-base indicator) to determine the amount of the alkali component(s). If the above-defined alkali component(s) is in an amount of 0.7 mg or less, it is possible to avoid alkali elution (extraction) problems such as stain, weathering and bloom.

The chemical composition of the first glass is described in detail as follows. The first glass contains 50–65 wt % of $SiO_2$. In fact, $SiO_2$ is used for forming skeleton of the first glass and is an essential component of the first glass as a glass for WDM optical filter. Less than 50 wt % of $SiO_2$ makes the glass condition unstable, resulting in possibility of devitrification or the like. Greater than 65 wt % of $SiO_2$ makes the thermal expansion coefficient too low. In other words, it becomes difficult to obtain an average thermal expansion coefficient of $110 \times 10^{-7}/°C$ or greater within a range of 50–150° C.

The first glass contains 5–25 wt % of $Na_2O$. $Na_2O$ is used for increasing thermal expansion coefficient of glass and is another essential component of the first glass as a glass for WDM optical filter. In other words, at least 5 wt % of $Na_2O$ is necessary for obtaining an average thermal expansion coefficient of $110 \times 10^{-7}/°C$. or greater within a range of 50–150° C. Greater than 25 wt % of $Na_2O$ makes the glass condition unstable, resulting in possibility of devitrification or the like.

The first glass contains 4–20 wt % of $K_2O$. Similar to $Na_2O$, $K_2O$ is used for increasing thermal expansion coefficient of glass and is another essential component of the first glass as a glass for WDM optical filter. In other words, at least 4 wt % of $K_2O$ is necessary for obtaining an average thermal expansion coefficient of $110 \times 10^{-7}/°C$. or greater within a range of 50–150° C. Greater than 20 wt % of $K_2O$ makes the glass condition unstable, resulting in possibility of devitrification or the like.

The first glass may contain 0–20 wt % of CaO (an optional component) for adjusting thermal expansion coefficient, Young's modulus and density of the first glass. CaO must be in an amount of 20 wt % or lower in order to obtain an average thermal expansion coefficient of $110 \times 10^{-7}/°C$. or greater within a range of 50–150° C. and a Young's modulus of 80 GPa or less. Greater than 20 wt % of CaO makes the glass condition unstable, resulting in possibility of devitrification or the like.

Similar to CaO, the first glass may contain 0–10 wt % of MgO (an optional component) and 0–10 wt % of BaO (an optional component) for adjusting thermal expansion coefficient, Young's modulus and density of the first glass. In fact, a part of CaO may be replaced with MgO and/or BaO to the extent that each of them is in an amount of 10 wt % or less, in order to adjust thermal expansion coefficient and Young's modulus. If MgO and/or BaO exceeds 10 wt %, the glass condition becomes unstable, resulting in possibility of devitrification or the like.

The first glass may contain 0–10 wt % of $Al_2O_3$ (an optional component) for stabilizing the glass condition and for adjusting thermal expansion coefficient and Young's modulus. Greater than 10 wt % of $Al_2O_3$ makes the thermal expansion coefficient too low. In other words, it becomes difficult to obtain an average thermal expansion coefficient of $110 \times 10^{-7}/°C$. or greater within a range of 50–150° C.

The first glass may contain 0–10 wt % of $TiO_2$ (an optional component) for adjusting Young's modulus. In fact, a part of $SiO_2$ may be replaced with $TiO_2$ to the extent that $TiO_2$ is in an amount of 10 wt % or less, in order to adjust Young's modulus. Greater than 10 wt % of $TiO_2$ makes the glass condition unstable, resulting in possibility of devitrification or the like. Furthermore, Young's modulus becomes 80 GPa or greater, resulting in a brittle glass.

The first glass may contain $Li_2O$, $B_2O_3$ and $ZrO_2$ (optional components), each being in an amount of 5 wt % or less, to the extent of not interfering with the above-explained physical characteristics of the first glass.

The chemical composition of the second glass is described in detain as follows. The second glass contains 35–55 wt % of $SiO_2$. In fact, $SiO_2$ is used for forming skeleton of the second glass and is an essential component of the second glass as a glass for WDM optical filter. Less than 35 wt % of $SiO_2$ makes the glass condition unstable, resulting in possibility of devitrification or the like. Greater than 55 wt % of $SiO_2$ makes the thermal expansion coefficient too low. In other words, it becomes difficult to obtain an average thermal expansion coefficient of $100 \times 10^{-7}/°C$. or greater within a range of 50–150° C.

The second glass contains 10–30 wt % of $TiO_2$ (an essential component) for the purposes of providing the glass with a suitable thermal expansion coefficient and of improving Young's modulus. If it is less than 10 wt %, it is difficult to achieve such purposes. If it exceeds 30 wt %, the second glass becomes inferior in chemical durability, and Young's modulus exceeds 85 GPa.

The second glass contains 4–20 wt % of $ZrO_2$ (an essential component) for the purpose of improving chemical durability of the second glass. If it is less than 4 wt %, it is difficult to achieve such purpose. If it exceeds 20 wt %, the average thermal expansion coefficient becomes lower than $110 \times 10^{-7}/°C$. Furthermore, it is impossible to form the glass condition, resulting in devitrification.

The second glass contains 5–25 wt % of $Na_2O$ (an essential component) for the purpose of increasing thermal expansion coefficient of glass. If it is lower than 5 wt %, it is difficult to achieve such purpose. If it exceeds 25 wt %, the glass becomes unstable, resulting in possibility of devitrification or the like. Furthermore, the second glass becomes inferior in water resistance, resulting in stain, weathering or bloom.

The second glass may contain 0–10 wt % of $Al_2O_3$ (an optional component) for stabilizing the glass condition and for adjusting thermal expansion coefficient and Young's modulus. Greater than 10 wt % of $Al_2O_3$ makes the thermal expansion coefficient too low. In other words, it becomes difficult to obtain an average thermal expansion coefficient of $100 \times 10^{-7}/°C$. or greater within a range of 50–150° C.

The second glass may contain 0–20 wt % of $CeO_2$ (an optional component) for adjusting thermal expansion coefficient and for improving elastic modulus. $CeO_2$ is used as a replacement for a part of $SiO_2$ and $TiO_2$. If it exceeds 20 wt %, the glass condition is not formed depending on the $CeO_2$ content relative to the contents of other components.

The second glass may contain 0–5 wt % of $Li_2O$ (an optional component) for adjusting thermal expansion coefficient and Young's modulus. If it exceeds 5 wt %, the glass becomes unstable, resulting in possibility of devitrification or the like.

The second glass may contain 0–20 wt % of $K_2O$ (an optional component) for increasing thermal expansion coefficient. If it exceeds 20 wt %, the second glass becomes inferior in water resistance.

The second glass may contain 0–3 wt % of at least one metal oxide selected from MgO, CaO, SrO, BaO, and ZnO, for adjusting thermal expansion coefficient. If this at least one metal oxide is coexistent with $TiO_2$, devitrification tendency will increase. Therefore, it is not necessary to add more than 3 wt % of the at least one metal oxide.

The chemical composition of the third glass is described in detain as follows. The third glass contains 35–55 wt % of $SiO_2$. In fact, $SiO_2$ is used for forming skeleton of the third glass and is an essential component of the third glass as a glass for WDM optical filter. Less than 35 wt % of $SiO_2$ makes the glass condition unstable, resulting in possibility of devitrification or the like. Greater than 55 wt % of $SiO_2$ makes the thermal expansion coefficient too low.

The third glass may contain 0–20 wt % of $Al_2O_3$ (an optional component) for stabilizing the glass condition and for adjusting thermal expansion coefficient and Young's modulus. Greater than 20 wt % of $Al_2O_3$ makes the thermal expansion coefficient too low.

The third glass may contain 0–10 wt % of $B_2O_3$ (an optional component) for adjusting thermal expansion coefficient and Young's modulus. If it exceeds 10 wt %, thermal expansion coefficient may become too high, and Young's modulus may become too low.

The third glass contains 1–35 wt % of $TiO_2$ (an essential component) for the purposes of providing the glass with a suitable thermal expansion coefficient and of improving Young's modulus. If it is coexistent with $CeO_2$, the third glass will have a strong absorption in the visible light region. If it is less than 1 wt %, it is difficult to achieve the above purposes. If it is greater than 35 wt %, glass may not be formed depending on the $TiO_2$ content relative to the $SiO_2$ content. Even if a glass is formed, thermal expansion coefficient tends to become too low.

The third glass contains 1–15 wt % of $CeO_2$ (an essential component) for the purposes of adjusting thermal expansion coefficient and of improving elastic modulus or of putting a reddish brown color to the third glass through trivalent Ti ion formation due to its interaction with Ti ions. If it is less than 1 wt %, it is difficult to achieve the above purposes. If it exceeds 15 wt %, glass condition may not be formed depending on the $CeO_2$ content relative to the content of other components.

The third glass may contain 0–10 wt % of $Li_2O$ (an optional component) for adjusting thermal expansion coefficient and Young's modulus. If it exceeds 10 wt %, the glass becomes unstable, resulting in possibility of devitrification or the like.

The third glass contains 5–25 wt % of $Na_2O$ (an essential component) for the purpose of increasing thermal expansion coefficient of glass. If it is lower than 5 wt %, it is difficult to achieve such purpose. If it exceeds 25 wt %, the glass becomes unstable, resulting in possibility of devitrification or the like. Furthermore, the third glass becomes inferior in water resistance, resulting in stain, weathering or bloom.

The third glass may contain 0–20 wt % of $K_2O$ (an optional component) for increasing thermal expansion coefficient. If it exceeds 20 wt %, the third glass becomes inferior in water resistance.

The third glass may contain 0–5 wt % of at least one metal oxide selected from MgO, CaO, SrO, BaO, and ZnO, for the purpose of adjusting thermal expansion coefficient, to the extent of not interfering with this purpose.

The third glass may have an internal transmittance of at least 90%, preferably at least 95%, more preferably 99%, at a thickness of 1 mm of the glass at a wavelength of 1,300 nm. This internal transmittance is good for transmission characteristics of optical communication. In contrast, low transmission in a wavelength region exceeding 1,300 nm, particularly exceeding 1,500 nm, causes an adverse effect on transmission characteristics of optical communication. It is possible to obtain good transmission characteristics of optical communication as a WDM optical filter glass with higher light transmittance in a wavelength region exceeding 1,300 nm.

The third glass may have a color (i.e., low transmittance or absorption in the visible light region) if such low transmittance occurs at a wavelength less than 1,300 nm. Such color is derived from the existence of Ti ions and Ce ions in the glass and brings about an advantage of eliminating noise (unnecessary) light.

The following nonlimitative examples are illustrative of the present invention. Examples 1-1 to 1-9, Examples 2-1 to 2-6, and Examples 3-1 to 3-7 are respectively illustrative of the first, second and third glasses according to the present invention.

EXAMPLES 1-1 to 1-9 & COMPARATIVE EXAMPLES 1-1 to 1-5

In each of these examples and comparative examples, raw materials (in the form of oxides, carbonates, nitrates and the like) of a glass composition were weighed and mixed together, as shown in Tables 1 and 2.

The resulting mixture was put into a 2000 ml platinum crucible (containing 10 wt % of rhodium) and then melted for 5 hr in an electric furnace at a temperature of 1,300° C. The resulting glass melt was poured into a graphite mold, and then the mold was put into an electric furnace previously maintained at about glass transition temperature to maintain the mold therein for 2 hr. Then, the mold was cooled down; thereby obtaining a glass block (dimensions: 30 mm (thickness)×200 mm×300 mm).

Then, the glass block was cut into a thin slice, followed by grinding into a cylindrical shape and then grinding both the surfaces. Then, one ground surface of the thin slice was coated with a dielectric multilayer film by alternately laminating $Ta_2O_5$ layers and $SiO_2$ layers by a vapor deposition method. The resulting laminate was ground to have a thickness of 1 mm from the uncoated side. After that, two anti-reflection films were formed on the multilayer film and the uncoated ground surface. The multilayer film and the anti-reflection films were formed by vapor deposition method. Other usable methods include RF ion plating, magnetron sputtering, and plasma ion plating.

Then, the resulting laminate was cut into a square chip (thickness: 1 mm; widths: 1.5 mm) in a manner to bring a rotating diamond cutter blade (having a diamond powder on a metal disk blade) into contact with the laminate from the uncoated side.

The above-mentioned glass block was subjected to evaluation tests to determine the average thermal expansion coefficient of 50–150° C., Young's modulus, glass transition point (Tg), and density. Thermal expansion coefficient was measured with a differential thermal dilatometer from 50 to 150° C. using silica glass as a standard. Young's modulus was measured at room temperature by an ultrasonic pulse method (sing-around method) using a 5 MHz transducer. The results are shown in Tables 1 and 2.

Furthermore, the glass composition was evaluated with respect to devitrification characteristic, as follows. Firstly, the obtained glass was put into a 100 ml platinum crucible (containing 10 wt % of rhodium) and then maintained for 1 hr at each temperature at which $log\eta=2$ dPa·S, 3 dPa·S or 4 dPa·S where $\eta$ is glass viscosity. After that, the glass was evaluated as "good" if there is no devitrification and as "not good" if there is devitrification, as shown in Tables 1 and 2.

Furthermore, the glass composition was evaluated with respect to workability, as follows. The above-obtained square chip was observed with a magnifier if there is chipping or not. In this observation, it was evaluated as "A" if there is no such chipping that makes the use of WDM optical filter impossible, "B" if there is such chipping, and "C" if the glass block is broken by failure of cutting into the square chip, as shown in Tables 1 and 2.

TABLE 1

| Composition (wt %) | Ex. 1-1 | Ex. 1-2 | Ex. 1-3 | Ex. 1-4 | Ex. 1-5 | Ex. 1-6 | Ex. 1-7 | Ex. 1-8 | Ex. 1-9 |
|---|---|---|---|---|---|---|---|---|---|
| $SiO_2$ | 56.5 | 56.0 | 53.6 | 57.9 | 54.7 | 53.1 | 55.8 | 50.9 | 55.4 |
| $TiO_2$ | | | | | | 6.4 | | | |
| $Al_2O_3$ | | 1.6 | 1.5 | | 3.2 | | 3.3 | 7.8 | 3.2 |
| MgO | | 1.6 | | | | | 5.5 | | 3.2 |
| CaO | 14.1 | 13.7 | 13.1 | 18.0 | 17.6 | 18.0 | 11.0 | 17.3 | 13.4 |
| BaO | | | 5.8 | | | | | | |
| $Li_2O$ | | | | | | | | | |
| $Na_2O$ | 11.7 | 10.8 | 10.3 | 12.0 | 9.7 | 14.9 | 9.9 | 9.5 | 9.9 |
| $K_2O$ | 17.7 | 16.3 | 15.7 | 12.1 | 14.8 | 7.6 | 14.5 | 14.5 | 14.9 |
| $\alpha_{50-150}$ ($\times 10^{-7} \cdot K^{-1}$) | 128.2 | 119.7 | 120.3 | 114.7 | 111.3 | 112.9 | 111.4 | 111.1 | 112.0 |
| Young's Modulus | 71 | 76 | 72 | 71 | 75 | 73 | 74 | 72 | 71 |
| Tg (° C.) | 502 | 513 | 509 | 536 | 552 | 537 | 566 | 562 | 530 |
| Density (g.cm$^{-3}$) | 2.605 | 2.605 | 2.695 | 2.627 | 2.627 | 2.708 | 2.594 | 2.632 | 2.605 |
| Devitrification Characteristic | Good | Good | Good | Good | Good | Good | Good | Good | Good |
| Workability | A | A | A | A | A | A | A | A | A |

Blank Column: no addition

TABLE 2

| Composition (wt %) | Com. Ex. 1-1 | Com. Ex. 1-2 | Com. Ex. 1-3 | Com. Ex. 1-4 | Com. Ex. 1-5 |
|---|---|---|---|---|---|
| $SiO_2$ | 68.5 | 58.1 | 50.0 | 50.8 | 41.0 |
| $TiO_2$ | | | | | 29.3 |
| $Al_2O_3$ | | | 15.0 | 3.0 | 0.0 |
| MgO | | | | | |
| CaO | 12.5 | 21.7 | 16.5 | 12.3 | |
| BaO | | | | 11.2 | 4.0 |
| $Li_2O$ | | | | | 2.3 |
| $Na_2O$ | 9.6 | 8.0 | 9.9 | 9.0 | 14.5 |
| $K_2O$ | 9.4 | 12.2 | 8.6 | 13.7 | 8.9 |
| $\alpha_{50-150}$ ($\times 10^{-7} \cdot K^{-1}$) | 98.0 | 112.4 | 99.0 | 124.6 | 118.0 |
| Young's Modulus | 70 | 71 | 77 | 69 | 85 |
| Tg (° C.) | 556 | 572 | 570 | 517 | 498 |
| Density (g.cm$^{-3}$) | 2.523 | 2.643 | 2.615 | 2.784 | 2.883 |
| Devitrification Characteristic | Good | Not Good | Not Good | Good | Not Good |
| Workability | A | A | A | B | C |

Blank Column: no addition

EXAMPLES 2-1 to 2-6 & COMPARATIVE EXAMPLES 2-1 to 2-5

In each of these examples and comparative examples, Example 1-1 was repeated except in that chemical composition was modified as shown in Tables 3 and 4 and that the evaluation tests were modified as explained as follows.

The obtained glass block was subjected to evaluation tests to determine the average thermal expansion coefficient of 50–150° C., Young's modulus, glass transition point (Tg), and Vickers Hardness (Hv). The results are shown in Tables 3 and 4. Water resistance test was conducted in accordance with JIS R 3502. The amount of the extracted alkali component is shown in terms of $Na_2O$ in Tables 3 and 4.

In Comparative Examples 2-3 and 2-4, vitrification did not occur, and therefore the evaluation tests were not conducted.

TABLE 3

| Composition (wt %) | Ex. 2-1 | Ex. 2-2 | Ex. 2-3 | Ex. 2-4 | Ex. 2-5 | Ex. 2-6 |
|---|---|---|---|---|---|---|
| $SiO_2$ | 44.4 | 45.0 | 42.9 | 44.1 | 42.1 | 43.0 |
| $TiO_2$ | 23.6 | 26.3 | 25.1 | 26.4 | 19.0 | 17.2 |
| $ZrO_2$ | 9.1 | 5.5 | 5.2 | 4.5 | 5.2 | 17.6 |
| $CeO_2$ | | | | | 12.1 | |
| MgO | | | | | | |
| CaO | | | | | | |
| BaO | | | | | | |
| $Li_2O$ | | | 3 | | | |
| $Na_2O$ | 22.9 | 23.2 | 10.3 | 18.1 | 21.6 | 22.2 |
| $K_2O$ | | | 13.5 | 6.9 | | |
| $\alpha_{50-150}$ ($\times 10^{-7} \cdot K^{-1}$) | 106 | 108 | 115 | 113 | 110 | 101 |
| Young's Modulus | 81.5 | 81.6 | 76.3 | 80.5 | 82.3 | 84.7 |
| Tg (° C.) | 584 | 590 | 545 | 560 | 580 | 618 |
| Vickers Hardness | 600 | 560 | 570 | 580 | 580 | 600 |
| Water Resistance (mg) | 0.31 | 0.33 | 0.44 | 0.48 | 0.3 | 0.25 |

Blank Column: no addition

TABLE 4

| Composition (wt %) | Com. Ex. 2-1 | Com. Ex. 2-2 | Com. Ex. 2-3 | Com. Ex. 2-4 | Com. Ex. 2-5 |
|---|---|---|---|---|---|
| $SiO_2$ | 60.0 | 37.8 | 34.0 | 39.0 | 50.8 |
| $TiO_2$ | 20.0 | 31.0 | 14.1 | 13.5 | |
| $ZrO_2$ | 5.3 | 0.0 | 4.7 | 21.0 | |
| $CeO_2$ | 3.2 | | 21.7 | | 3.0 |
| MgO | | | | 4.5 | |
| CaO | | | | | 12.3 |
| BaO | | | | | 11.2 |
| $Li_2O$ | | 2.5 | | | |
| $Na_2O$ | 11.5 | 15.6 | 12.7 | 9.0 | 9.0 |
| $K_2O$ | | 9.0 | 12.8 | 13.0 | 13.7 |
| $\alpha_{50-150}$ (× $10^{-7} \cdot K^{-1}$) | 70 | 117 | Not vitrified | Not vitrified | 125 |
| Young's Modulus | 73.5 | 87.0 | | | 69.0 |
| Tg (° C.) | 630 | 498 | | | 517 |
| Vickers Hardness | 560 | 560 | | | 520 |
| Water Resistance (mg) | 0.25 | 0.75 | | | 1.5 |

Blank Column: no addition

EXAMPLES 3-1 to 3-7 & COMPARATIVE EXAMPLES 3-1 to 3-9

In each of these examples and comparative examples, Example 1-1 was repeated except in that chemical composition was modified as shown in Tables 5 and 6, that the melting temperature was 1,400° C. in place of 1,300° C., and that the evaluation tests were modified as explained as follows.

The obtained glass block was subjected to evaluation tests to determine the average thermal expansion coefficient of 50–150° C. and Young's modulus in the same manners as those of Example 1-1. The results are shown in Tables 5 and 6.

The obtained square chip was subjected to a noticeability test. In this test, the chip was placed on a glass plate (widths: 30 mm) that had been subjected to a surface treatment similar to that of the dielectric multilayer film and the anti-reflection film. It was judged as "good" if the position of the chip on the glass plate can be noticed instantaneously and as "not good" if that cannot. The color of the glass block was recorded, as shown in Tables 5 and 6. Transmittance ($T_{i1300}$) of 1,300 nm wavelength at 1 mm thickness was measured with a U4000-type automated spectrophotometer of Hitachi Ltd. in accordance with Japan Optical Glass Industrial Standard (JOGIS 17-82).

Furthermore, internal transmittance (at 1 mm thickness) of the glass according to Example 3-1 was measured. The result is shown in Figure together with that of a conventional, commercial, colorless, transparent optical glass.

In Comparative Examples 3-1, 3-2, 3-4, 3-5 and 3-7, vitrification did not occur, and therefore the evaluation tests were not conducted. In fact, the transmittances of these comparative examples will naturally be judged as NG.

TABLE 5

| Composition (wt %) | Ex. 3-1 | Ex. 3-2 | Ex. 3-3 | Ex. 3-4 | Ex. 3-5 | Ex. 3-6 | Ex. 3-7 |
|---|---|---|---|---|---|---|---|
| $SiO_2$ | 42.8 | 42.0 | 40.0 | 41.0 | 46.7 | 47.8 | 38.4 |
| $Al_2O_3$ | 0 | 0.0 | 0.0 | 0.0 | 14.4 | 7.4 | 0.0 |
| $B_2O_3$ | 0 | 0.0 | 0.0 | 0.0 | 0.0 | 5.0 | 0.0 |
| $TiO_2$ | 22.8 | 24.6 | 21.7 | 21.8 | 3.4 | 3.5 | 28.4 |
| $CeO_2$ | 12.3 | 7.2 | 11.7 | 11.7 | 7.3 | 7.5 | 9.8 |
| $Li_2O$ | 0 | 0 | 0 | 0 | 2.1 | 2.2 | 2.1 |
| $Na_2O$ | 22.1 | 13.0 | 12.6 | 12.7 | 11.4 | 11.7 | 13.2 |
| $K_2O$ | 0 | 13.2 | 14.1 | 12.8 | 14.7 | 15.0 | 8.1 |
| $\alpha_{50-150}$ (× $10^{-7} \cdot K^{-1}$) | 112 | 108 | 123 | 120 | 118 | 120 | 114 |
| Young's Modulus | 80 | 82 | 76 | 76 | 78 | 76 | 86 |
| Noticeability | Good | Good | Good | Good | Good | Good | Good |
| Color | Reddish Brown | Reddish Brown | Reddish Brown | Reddish Brown | Brown | Brown | Reddish Brown |
| $T_{i1300}$ (%) | 99.6 | 99.7 | 99.6 | 99.5 | 99.9 | 99.9 | 99.4 |

TABLE 6

| Composition (wt %) | Com Ex. 3-1 | Com. Ex. 3-2 | Com. Ex. 3-3 | Com. Ex. 3-4 | Com. Ex. 3-5 | Com. Ex. 3-6 | Com. Ex. 3-7 | Com. Ex. 3-8 | Com. Ex. 3-9 |
|---|---|---|---|---|---|---|---|---|---|
| $SiO_2$ | 38.5 | 33.0 | 40.2 | 32.5 | 50.0 | 60.0 | 36.7 | 44.7 | 55.0 |
| $Al_2O_3$ | 0.0 | 0.0 | 0.0 | 0.0 | 0.0 | 0.0 | 24.2 | 8.7 | 9.0 |
| $B_2O_2$ | 0.0 | 0.0 | 19.8 | 0.0 | 0.0 | 0.0 | 0.0 | 6.3 | 5.3 |
| $TiO_2$ | 15.4 | 20.0 | 9.2 | 37.5 | 5.0 | 20.0 | 3.4 | 11.4 | 0.0 |
| $CeO_2$ | 22.1 | 8.0 | 3.5 | 3.0 | 5.0 | 5.0 | 7.3 | 0.0 | 0.0 |
| $Li_2O$ | 0.0 | 2.0 | 0.0 | 2.0 | 1.0 | 1.0 | 2.1 | 2.2 | 2.4 |
| $Na_2O$ | 11.9 | 20.0 | 21.2 | 13.5 | 14.0 | 12.0 | 11.4 | 11.5 | 12.4 |
| $K_2O$ | 12.1 | 17.0 | 6.1 | 11.5 | 25.0 | 2.0 | 14.7 | 14.8 | 16.1 |
| $\alpha_{50-150}$ (× $10^{-7} \cdot K^{-1}$) | Not Vitrified | Not Vitrified | 135 | Not Vitrified | Not Vitrified | 97 | Not Vitrified | 118.0 | 115.0 |
| Young's Modulus | | | 70 | | | 86 | | 77.0 | 76.0 |
| Noticeability | | | Good | | | Good | | Not Good | Not Good |
| Color | | | Brown | | | Reddish Brown | | Pale Yellow; Transparent | Colorless; Transparent |
| $T_{i1300}$ (%) | | | 2.695 | | | 2.708 | | 2.632 | 2.605 |

The entire disclosure of each of Japanese Patent Application No. 2002-151696 filed on May 27, 2002, Japanese Patent Application No. 2002-151695 filed on May 27, 2002, and Japanese Patent Application No. 2002-186216 filed on Jun. 26, 2002, including specification, claims, summary and drawings, is incorporated herein by reference in its entirety.

What is claimed is:

1. A glass for a wavelength division multiplexing optical filter, comprising:
   50–58 wt % of $SiO_2$, 9–12 wt % of $Na_2O$, 7–18 wt % of $K_2O$, 11–18 wt % of CaO, 0–6 wt % of MgO, 0–6 wt % of BaO, 0–8 wt % of $Al_2O_3$, and 0–7 wt % of $TiO_2$; and
   having an average thermal expansion coefficient of from $110 \times 10^{-7}/°$ C. to $130 \times 10^{-7}/°$ C. within a range of 50–150° C.;
   having a Young's modulus of 80 GPa or lower; and
   having a density of 2.8 g/cm$^3$ or lower,
   wherein the glass has a bandpass, optical, multi-layer film on a surface of the glass.

2. A glass according to claim 1, which has a glass transition point of 500° C. or higher.

3. A wavelength division multiplexing optical filter comprising:
   a glass containing 50–58 wt % of $SiO_2$, 9–12 wt % of $Na_2O$, 7–18 wt % of $K_2O$, 11–18 wt % of CaO, 0–6 wt % of MgO, 0–6 wt % of BaO, 0–8 wt % of $Al_2O_3$, and 0–7 wt % of $TiO_2$; the glass having an average thermal expansion coefficient of from $110 \times 10^{-7}/°$ C. to $130 \times 10^{-7}/°$ C. within a range of 50–150° C.; having a Young's modulus of 80 GPa or lower; and having a density of 2.8 g/cm$^3$ or lower; and
   a bandpass, optical, multi-layer film formed on a surface of the glass.

4. A wavelength division multiplexing optical filter according to claim 3, wherein the glass has a glass transition point of 500° C. or higher.

5. A wavelength division multiplexing optical filter according to claim 3, wherein the multi-layer film is a dielectric multi-layer film with alternating layers of $Ta_2O_5$ and $SiO_2$.

6. A process for producing a wavelength division multiplexing optical filter, comprising the steps of:
   (a) providing a glass containing 50–58 wt % of $SiO_2$, 9–12 wt % of $Na_2O$, 7–18 wt % of $K_2O$, 11–18 wt % of CaO, 0–6 wt % of MgO, 0–6 wt % of BaO, 0–8 wt % of $Al_2O_3$, and 0–7 wt % of $TiO_2$; the glass having an average thermal expansion coefficient of from $110 \times 10^{-7}/°$ C. to $130 \times 10^{-7}/°$ C. within a range of 50–150° C.; having a Young's modulus of 80 GPa or lower; and having a density of 2.8 g/cm$^3$ or lower; and
   (b) forming a bandpass, optical, multi-layer film on a surface of the glass.

7. A process according to claim 6, wherein the glass has a glass transition point of 500° C. or higher.

8. A process according to claim 6, wherein the multi-layer film of the step (b) is formed by alternately laminating $Ta_2O_5$ layers and $SiO_2$ layers.

* * * * *